Patented Feb. 18, 1930

1,747,804

UNITED STATES PATENT OFFICE

JOHN T. TRAVERS AND MARTHA E. TRAVERS, OF COLUMBUS, OHIO, ASSIGNORS, BY DIRECT AND MESNE ASSIGNMENTS, TO THE OHIO SANITARY ENGINEERING CORPORATION, OF COLUMBUS, OHIO, A CORPORATION OF OHIO

METHOD OF PRODUCING A BALANCED ENVIRONMENT FOR FISH LIFE

No Drawing.   Application filed May 18, 1928.   Serial No. 278,907.

This invention relates to the provision of a balanced environment capable of sustaining fish and aquatic life for prolonged periods. In its broader aspect, it is the object and purpose of the invention to provide an environment meeting all the essential requirements for sustaining fish life in a healthful and thriving condition.

It is a further specific object of the invention to provide an environment in a still water aquarium in which both fish and aquatic plant life may be sustained for prolonged periods without necessitating any change in the water of the aquarium.

It is well recognized that the chemical conditions of water are extremely important from the standpoint of its ability to sustain and to maintain a healthy environment for fish life. Fish are extremely sensitive to changes in the water in which they live, more particularly with respect to changes in the alkalinity thereof. It is, of course, well recognized that fish cannot live in water that is even slightly acid. Water to sustain fish life must have a slight alkaline reaction, for example, of the character imparted thereto by the bi-carbonates of calcium and magnesium, more especially the former. Fish are also sensitive to variations in the dissolved oxygen content of the water. They cannot live in water containing less than 2.5 parts per million of dissolved oxygen and thrive best in water containing from 7 to 10 parts per million of dissolved oxygen. Algæ, which constitutes an important item in the natural diet of fish, furthermore, cannot grow in water having a pH below seven.

Aquatic plant life, which is highly desirable in an aquarium, also requires a normal alkalinity of the water, freedom from noxious poisons, and a presence of plant life necessities in the form of iron, silica, phosphates and potash.

The conventional still water aquarium, known to the prior art, fails utterly to conform to the foregoing requirements, and to that fact may be attributed the initial failure and ultimate abandoning of so many still water aquariums, since they do not possess the ability to sustain either fish life or aquatic plant life.

It is the present practice, in the maintenance of still water aquariums, to change the water daily. This practice inherently results in constant variation in the chemical conditions of the aquarium water, not only from day to day, but during the period of retention of a particular batch of water in the aquarium.

These constant chemical variations are due to the fact that the carbon dioxide given off by the fish unites with the water to form carbonic acid, the counter action of which gradually reduces the normal alkalinity of the water. If this action be sufficiently prolonged, the water of the aquarium will become acid. The dissolved oxygen content of the water is also gradually reduced. When the water is changed the fish are obviously subjected to a very sudden and radical change in the chemical condition of the water. The change in the chemical condition is usually accompanied by a variation in temperature of the water. Such sudden variations in the chemical condition of the water and the temperature thereof, is extremely harmful to fish life.

The excrement of the fish, furthermore, create a presence in the water of greater or less quantities of poisonous and noxious odor producing compounds such as indole, scatole, putrescine, cadaverine and the mercaptans. A stale aquarium will give off noxious odors due to the presence of these compounds.

The difficulties and objections encountered in aquariums are likewise common to any zone in which fish life may be restrained, as for example, in fish hatcheries and in cars and tanks employed for the transportation of fish life.

It has been a more or less common practice to attempt to alleviate the contaminating conditions found in zones in which fish life is restrained by placing in the water plants known as oxygenators. This has been done in an attempt to maintain a proper oxygen balance in the water. Such oxygenators function to convert carbon dioxide into oxygen. The use of oxygenators has, however, met with little success, inasmuch as the changing chemical conditions of the water are also exceedingly harmful to such aquatic plant life and sooner or later kill the plants employed as oxygenators.

We have ascertained that by placing in the water in which the fish life is maintained, a natural product composed of clay and calcium carbonate, the clay being in the process of decay, meeting certain definite specifications, that an environment particularly adaptable for sustaining fish life in a healthful and thriving condition may be obtained. It is also significant that the environment, so produced, is especially well adapted for sustaining aquatic plant life of a character upon which the fish life may feed, including the algæ, a very desirable, if not essential portion of the diet of fish life.

A suitable natural product, composed of calcium carbonate and clay, in the process of decay, for use in producing the desired environment for fish life and aquatic plant life, is travertine. We have ascertained that the best results are produced by employing a travertine which will meet with the following specifications:—

| | |
|---|---|
| Porosity | Not less than 100%. |
| Density | Not less than 2.3 and not over 2.5. |
| Calcium carbonate | Not less than 90% and not over 96%. |
| Structure | Amorphous, not crystalline. |

Travertine is a natural product composed of calcium carbonate and clay in the process of decay or weathering. It is scientifically recognized that during the period and following the period of decay, clays have marked adsorptive and absorptive properties. It is significant to note that the calcium carbonate content of travertine, while of the same chemical formula as that of calcium carbonate in limestone, chalk, oyster shells and the like, has physical properties differing greatly from those of such calcium carbonates. For example, the rate of the solubility of the calcium carbonate in travertine is far greater than for the calcium carbonate in oyster shells and limestone.

The presence of travertine in water in which fish life is maintained assures a substantially uniform normal alkalinity at all times. This is due to the presence of the bicarbonates of calcium or magnesium, or both. The carbon dioxide given off by the fish in the water, which would normally reduce the alkalinity of the water and eventually cause the same to become acid, will combine with the calcium carbonate which dissolves in solution from the travertine in accordance with the following equation:

$$CaCO_3 + H_2O + CO_2 = CaH_2(CO_3)_2$$

It will be noted that calcium bicarbonate, the normal alkilinty producer in water, is thus formed. The foregoing reaction is constantly occurring in an aquarium or zone in which fish life is restrained, resulting in changing the carbonic acid into the highly desirable calcium bicarbonate. The presence of travertine in the water therefore maintains a positive alkalinity balance. The alkalinity of the calcium bicarbonates produced is not such that the alkalinity of the water will ever be raised to an objectionable degree.

Fish life, furthermore flourishes in the presence of aquatic plant life. The presence of travertine in the water insures a supply of such plant life necessities as iron, silica, phosphates and potash. The aquarium plant life, therefore, flourishes in the environment which we produce and utilizes much of the carbon dioxide given off by the fish.

Since travertine is composed of calcium carbonate and clay in the process of decay, it possesses the capacity to absorb and adsorb the various noxious odor producing compounds found in varying amounts in the excrement of the fish, such odor producing compounds being indole, scatole, putrescine, cadaverine and mercaptans. The travertine, therefore, keeps the environment free from the accumulation of these objectionable poisons.

As a feature of the invention, it is desirable that at least a portion of the travertine employed project above the surface of the water. A portion of the water will thus pass by capillary attraction through the cells of the travertine and be exposed in thin layers to the oxygen of the air, thus becoming saturated with dissolved oxygen. The portion of the water layers find their way back into the zone in which the fish life is maintained and therefore add to the oxygen content of the water therein. A further advantage which accrues from the positioning of a portion of the travertine above the surface of the water resides in the fact that evaporation of a portion of the surface water occurs. This evaporation is accompanied by a lowering of the temperature of the surrounding travertine. This cooling effect is transmitted to the water and tends to prevent the water from reaching an excessive temperature. This cooling action cannot be ignored, since it is quite substantial, and furthermore, since fish life is extremely sensitive to excessive temperature conditions.

When travertine is employed in a still water aquarium, the necessity for changing the water is entirely eliminated, since the travertine continuously functions to maintain a balanced environment capable of sustaining both fish life and equatic plant life. In actual operation, a still water aquarium produced in accordance with the invention herein disclosed, has been employed for a period in excess of a year without requiring a change of the water, other than to compensate for evaporation.

From the foregoing, it will be apparent that we have provided a balanced enviroment for both fish life and aquatic plant life. The invention permits the production of such an environment in any zone wherein fish life is restrained, giving to such zone the characteristics of the natural environment of fish life and aquatic plant life.

Having thus described our invention, what we claim is:—

1. A method for producing an environment, characterized by its capacity to sustain fish life and aquatic plant life in a healthful thriving condition, comprising incorporating in the water of a zone in which fish are restrained, a quantity of travertine composed of calcium carbonate and clay in the process of decay, having a porosity of not less than 100%.

2. A method for producing an environment, characterized by its capacity to sustain fish life and aquatic plant life in a healthful thriving condition, comprising incorporating in the water of a zone in which fish are restrained, a quantity of travertine composed of calcium carbonate and clay in the process of decay, having a density of not less than 2.3 and not more than 2.5.

3. A method for producing an environment, characterized by its capacity to sustain fish life and aquatic plant life in a healthful thriving condition, comprising incorporating in the water of a zone in which fish are restrained, a quantity of travertine composed of calcium carbonate and clay in the process of decay, having a calcium carbonate content of not less than 90% and not over 96%.

4. A method for producing an environment, characterized by its capacity to sustain fish life and aquatic plant life in a healthful and thriving condition, comprising incorporating in the water of a zone in which fish are restrained, a quantity of travertine composed of calcium carbonate and clay in the process of decay, having a porosity of not less than 100%, a density ranging from 2.3 to 2.5 and a calcium carbonate content varying from 90% to 96%.

5. A method for producing an environment, characterized by its capacity to sustain fish life and aquatic plant life in a healthful and thriving condition, comprising incorporating in the water of a zone in which fish are restrained, of a quantity of travertine composed of calcium carbonate and clay in the process of decay, characterized by its capacity to adsorb and absorb indole, scatole, putrescine, cadaverine and mercaptans from the water present in the zone in which the fish are restrained.

6. A method for producing a balanced still water aquarium in which the water need not be changed, comprising placing in the water of the aquarium, a travertine composed of calcium carbonate and clay in the process of decay.

7. A method for producing a balanced still water aquarium in which the water need not be changed, comprising placing in the water of the aquarium, a travertine composed of calcium carbonate and clay in the process of decay, having a porosity of not less than 100%, a density ranging from 2.3 to 2.5 and a calcium carbonate content ranging from 90% to 96%.

Signed at Columbus, county of Franklin, and State of Ohio, this 14th day of May, 1928.

JOHN T. TRAVERS.
MARTHA E. TRAVERS.